United States Patent
Dean (10) Patent No.: US 8,696,843 B1
(45) Date of Patent: Apr. 15, 2014

(54) REPAIR OF ACOUSTICALLY TREATED STRUCTURES

(75) Inventor: Thomas Andrew Dean, Maple Valley, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/604,923

(22) Filed: Sep. 6, 2012

(51) Int. Cl.
*B32B 43/00* (2006.01)

(52) U.S. Cl.
USPC ........... 156/98; 29/401; 29/402.08; 29/896.2; 29/505; 29/521; 428/615; 428/116

(58) Field of Classification Search
USPC ................... 29/401, 402.08, 896.2, 505, 521; 428/615, 116; 156/98
See application file for complete search history.

(56) References Cited

U.S. PATENT DOCUMENTS

| | | | |
|---|---|---|---|
| 4,235,303 A | 11/1980 | Dhoore et al. | |
| 4,257,998 A | 3/1981 | Diepenbrock, Jr. et al. | |
| 4,265,955 A | 5/1981 | Harp et al. | |
| 4,759,513 A | 7/1988 | Birbragher | |
| 6,094,907 A | 8/2000 | Blackner | |
| 6,179,943 B1 | 1/2001 | Welch et al. | |
| 6,509,081 B1 | 1/2003 | Diamond | |
| 6,767,606 B2 | 7/2004 | Jackson et al. | |
| 7,854,298 B2 | 12/2010 | Ayle | |
| 7,954,224 B2 | 6/2011 | Douglas | |
| 2001/0048048 A1 | 12/2001 | Riedel et al. | |
| 2007/0275211 A1* | 11/2007 | Bogue | 156/98 |
| 2008/0135329 A1 | 6/2008 | Strunk et al. | |
| 2011/0200786 A1 | 8/2011 | Douglas | |
| 2012/0125523 A1* | 5/2012 | Dupre | 156/98 |

* cited by examiner

*Primary Examiner* — Jeff Aftergut
*Assistant Examiner* — Jaeyun Lee
(74) *Attorney, Agent, or Firm* — Yee & Associates, P.C.

(57) ABSTRACT

A method of repairing an acoustically treated area of a composite honeycomb sandwich structure restores the acoustic performance of the structure. An impaired section of the honeycomb core is removed and replaced with a honeycomb repair plug. Cell walls of the repair plug are bonded to cell walls of the core.

20 Claims, 7 Drawing Sheets

REPAIR OF ACOUSTICALLY TREATED STRUCTURES

BACKGROUND INFORMATION

1. Field

This disclosure generally relates to structures having acoustically treated areas for noise reduction, and deals more particularly with a repair method that restores the acoustic performance of acoustically treated aircraft structures.

2. Background

High bypass type aircraft engines produce noise due to the high airflows through inlets, rotating stages and exhaust nozzles of the engines. In order to reduce noise and satisfy noise regulations governing commercial aircraft, high bypass engines may incorporate acoustic panels in various parts of the engine, such as in the inlets of engine nacelles. These acoustic panels, sometimes referred to as acoustic treatments, may comprise a septumized honeycomb core sandwiched between a perforated inner skin and a non-perforated outer skin. The inner and outer skins may comprise a metal such as aluminum, or a composite, and the honeycomb core may comprise a metal, a ceramic or a composite.

Acoustic panels of the type described above sometimes require localized repair due to impact damage. For example, the acoustically smooth inlets of engine nacelles may suffer impact damage due to bird strikes or other foreign objects and debris (FOD). One existing technique for repairing such impact damage involves splicing the honeycomb core using foaming adhesives, however this repair method is undesirable because it results in blockage of honeycomb cells and a loss of acoustic smoothness. Some types of aircraft have allowable damage limits of acoustically treated areas, but regulations may not permit structural repair of these areas. In other aircraft, non-structural repairs are permitted for limited areas of a panel that that restore its acoustic properties, however existing structural repair techniques that do not restore acoustic properties are only permitted on a time limited basis. In these latter mentioned aircraft, the entire panel must be replaced in the event that it sustains any degree of structural impact damage.

Accordingly, there is a need for a method of repairing acoustically treated areas of a structure such as inlets of an engine nacelle, which restores acoustic performance, and which may be efficiently carried out by service personnel with minimum downtime of aircraft.

SUMMARY

The disclosed embodiments provide a method of repairing acoustically treated structures employing honeycomb sandwich panels which restores the acoustic and structural performance of the structure. The repair method may be carried out by service personnel in the field or in repair and maintenance facilities using conventional materials, with a minimum of aircraft downtime.

According to one disclosed embodiment, a method is provided of repairing an area of an acoustically treated structure having a cellular honeycomb core. The method comprises forming a cut-out section in the core by removing a volume of the core, and inserting a cellular honeycomb repair plug into the cut-out section. The method further comprises bringing cell wall edges of the repair plug into contact with cell wall edges of the core, and bonding together the cell wall edges of the repair plug and the cell wall edges of the core. The method may further comprise applying an adhesive to bottom edges of the repair plug, and applying adhesive to an outer facesheet beneath the cut-out section, wherein inserting the repair plug into the cut-out section includes bringing the bottom edges of the repair plug into contact with the outer facesheet. The method may also comprise fabricating the repair plug by cutting a plug blank from a cellular honeycomb core panel, and expanding or contracting the plug blank to substantially match the size and density of the cells of the core. Additionally, the method may comprise trimming cell wall edges of the core, and trimming cell wall edges of the repair plug to substantially match the trimmed cell wall edges of the core. Bonding the cell wall edges of the repair plug with the cell wall edges of the core may include applying an adhesive to opposing faces of the cell wall edges of the repair plug and the cell wall edges of the core before the cell wall edges of the repair plug are brought into contact with cell wall edges of the core. The cell wall edges of the repair plug may be biased against the cell wall edges of the core until the adhesive is cured. The biasing may be performed by stretching and applying tape between the core and the repair plug, and using the tape to apply a rotary force against the repair plug that forces the cell wall edges of the repair plug against the cell wall edges of the core. The method may further comprise removing acoustic septa from peripheral cells of the core surrounding the cut-out section and installing replacement septa in the peripheral cells after the bonding has been performed.

According to another disclosed embodiment, a method is provided of restoring the acoustic performance of an acoustically treated structure. The method comprises removing a volume of a cellular acoustic core in an acoustically impaired area of the structure, replacing the volume of the core that has been removed with a cellular repair plug, and bonding cell wall edges of the core to cell wall edges of the repair plug. Bonding the cell wall edges of the core to the cell wall edges of the repair plug may include applying an adhesive to at least one of the cell wall edges of the core and the cell wall edges of the repair plug, and bringing the cell wall edges of the repair plug into face-to-face contact with the cell wall edges of the repair plug. Bringing the cell wall edges of the repair plug into face-to-face contact with the cell wall edges of the repair plug may be performed by rotating the repair plug relative to the core. The method may also include trimming peripheral edges the core, and trimming peripheral edges of the repair plug such that the peripheral edges of the core overlap the peripheral edges of the repair plug. Bonding cell wall edges of the core to cell wall edges of the repair plug may include applying an adhesive between the cell wall edges of the core and cell wall edges of the repair plug, and curing the adhesive.

According to still another embodiment, a method is provided of repairing an acoustically treated structure having a honeycomb core. The method comprises removing an impaired volume of the honeycomb core to form a cut-out section in the core, trimming peripheral edges of the core surrounding the cut-out section to form cell wall edges projecting inwardly into the cut-out section, making a cellular repair plug, including sizing the repair plug to substantially fit the cut-out section and trimming outer peripheral cells of the repair plug to form cell wall edges that project outwardly toward the core, applying adhesive to the cell wall edges of the core and the cell wall edges of the repair plug, inserting the repair plug into the cut-out section in the core, and rotating the repair plug until the cell wall edges of the repair plug come into face-to-face contact with the cell wall edges of the core. The method may also comprise curing the adhesive, and biasing the repair plug tabs against the core while the adhesive is curing.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
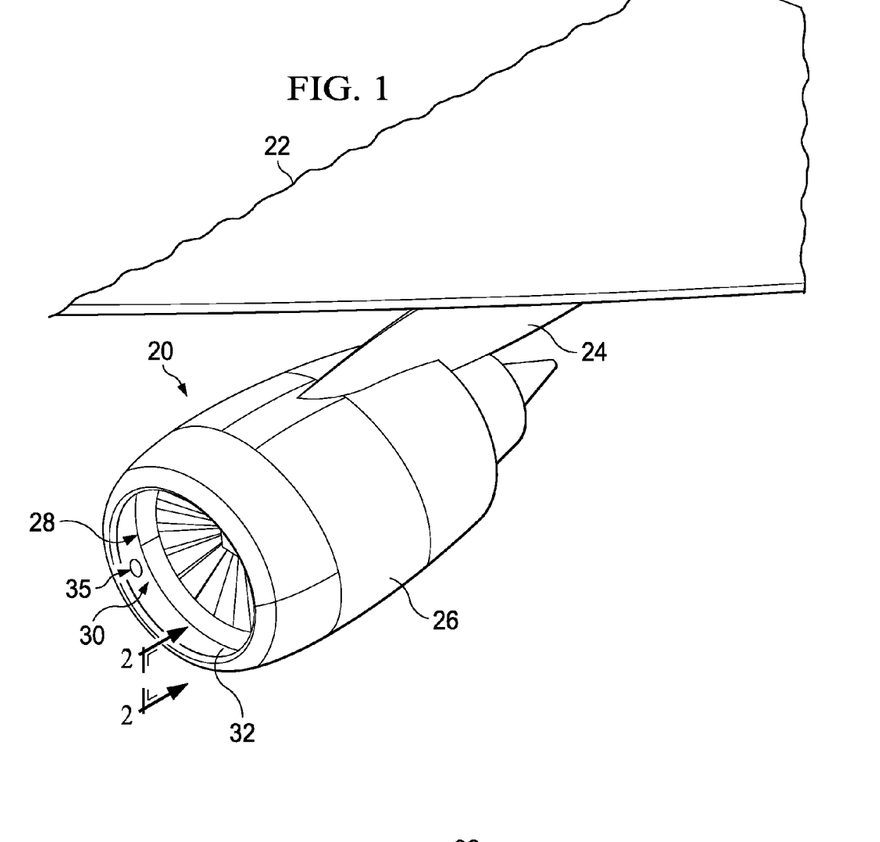
FIG. 1 is an illustration of a perspective view of a portion of the wing showing an engine having an acoustically treated inlet requiring repair.

Referring first to FIG. 1, a high bypass engine 20 is mounted an aircraft wing by a pylon 24. The engine 20 includes a surrounding engine nacelle 26 having an air inlet 28. The air inlet 28 includes an acoustically treated area 30 in the form of an acoustic panel 32 for reducing noise caused by high airflow through the air inlet 28 into the engine 20. The acoustic panel 32 includes an area 35 that has been damaged or impaired, and requires repair, hereinafter referred to as a repair area 35. The damage to the acoustic panel 32 may be the result of an impact, however the disclosed method may be employed to repair damage or impairments due to other causes and conditions.

Figure 2:
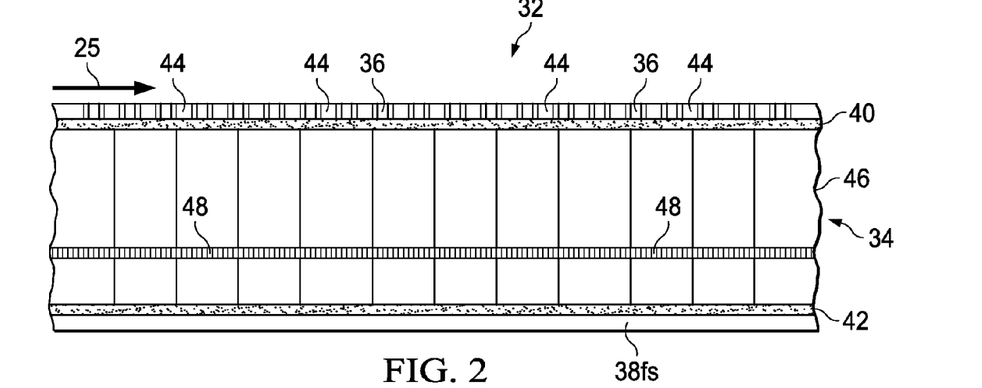
FIG. 2 is an illustration of a cross-sectional view of a portion of an acoustic panel forming part of the engine inlet shown in FIG. 1.
Figure 3:
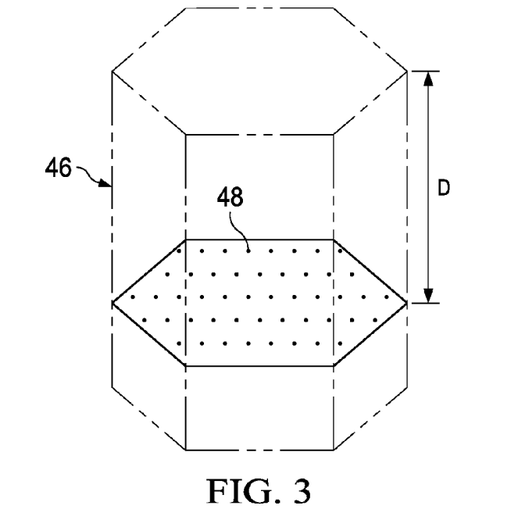
FIG. 3 is an illustration of an isometric view of one of the cells of the honeycomb core shown in FIG. 2.

Attention is now directed to FIG. 2 which illustrates additional details of the acoustic panel 32. The panel 32 broadly comprises a cellular honeycomb core sandwiched between inner and outer facesheet 36, 38, respectively. The inner facesheet 36 includes a multiplicity of perforations therethrough 44 which allow soundwaves including noise to pass through the inner facesheet 36 into the core 34. The inner facesheet 36 is attached to face of the honeycomb core 34 by an adhesive bond line 40. Similarly, the outer facesheet 38 is attached to the other face of the honeycomb core 34 by an adhesive bond line 42. In the illustrated embodiments, the inner and outer facesheets 36, 38 respectively each comprise a laminated composite such as a CFRP (carbon fiber reinforced plastic) however, either of these facesheets may comprise other materials such as, without limitation, a metal such as aluminum. The honeycomb core 34 may comprise a metal such as aluminum, a polymer or other materials and is formed of a multiplicity of individual polygonal cells 46. In the illustrated example, the cells 46 are hexagonal, however other cell geometries are possible. The honeycomb core 34 is septumized by a plurality of individual septums 48 that are positioned within the cells 46 at a preselected depth "D". The septa 48 assist in dampening and attenuating soundwaves entering honeycomb core 34 through the perforations 44 in the inner facesheet 36.

Figure 4:
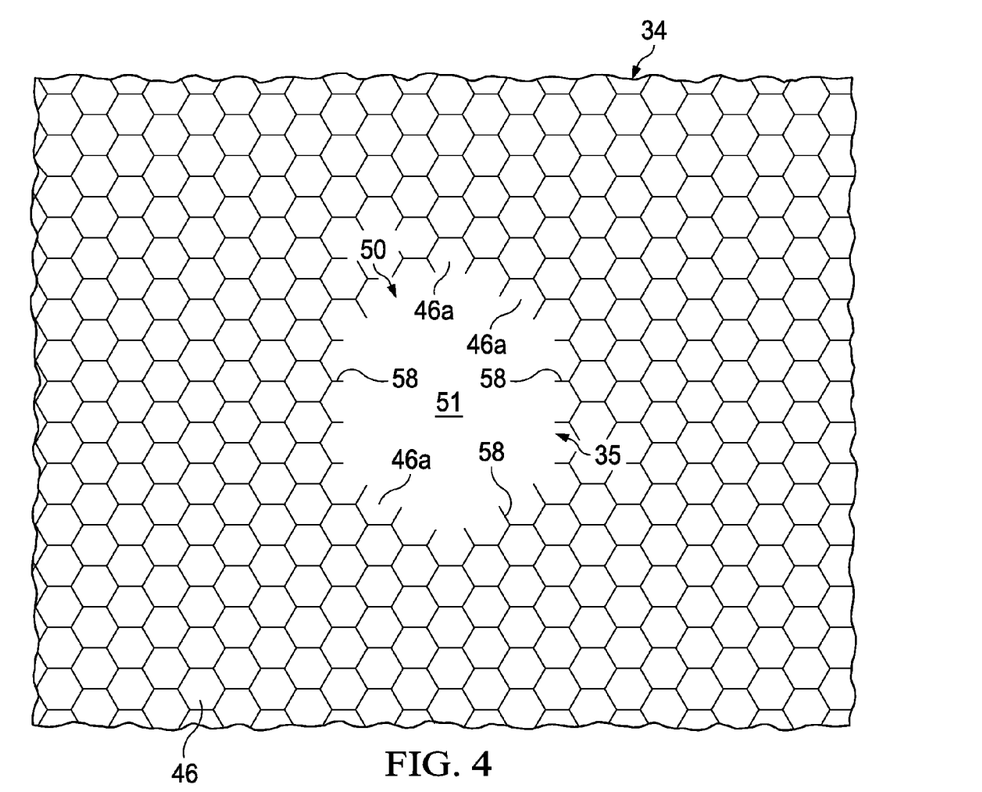
FIG. 4 is an illustration of a plan view of a portion of a honeycomb core requiring repair, a damaged section of the core having been removed.

Referring now to FIG. 4, the process of repairing an area 35 of the acoustic panel 32 begins with removing a portion of the inner facesheet 36 (FIG. 2) which overlies the area 35 of the honeycomb core 34 that has been damaged or is otherwise impaired. Then, a generally circularly shaped volume 50 of the honeycomb core 34 is removed from the area 35 using a router or other suitable cutting tools, thereby forming a cut-out section 51 in the core 34. In some embodiments of the method, it may be possible to remove the damaged section of the core 34 and the overlying portion of the inner facesheet 36 simultaneously. Next, the peripheral cells 46a surrounding the cut-out section 51 are trimmed, such that inwardly extending, flat core cell wall edges 58 remain which extend inwardly into the cut-out section 51 in the core 34. The process of removing of the volume 50 from the core 34 may damage the septums 48 in the peripheral cells 46a which surround and face the cut-out section 51. Consequently, the damaged septa 48 in the peripheral cells 46a are completely removed by trimming (e.g. cutting) them away.

Figure 5:
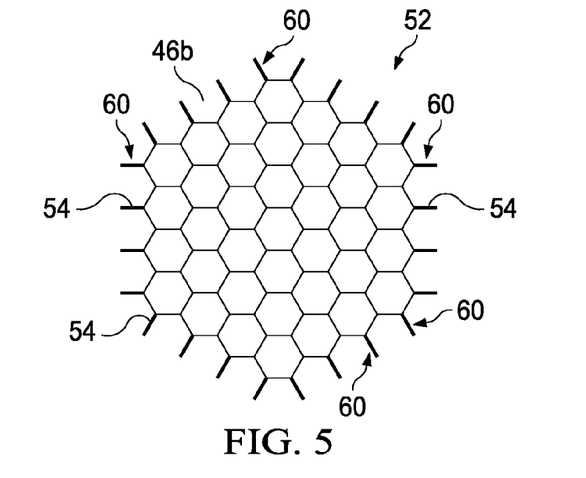
FIG. 5 is an illustration of a repair plug having trimmed outer cell wall edges.

Referring to FIG. 5, in order to replace the cut-out section 51, a cellular repair plug 52 is fabricated which is formed of a material and has the cell size/geometry as the core 34. For example, the repair plug 52 may be cut from a plug blank (not shown) honeycomb core panel which is substantially the same material from which the cellular honeycomb core 34 is made. The repair plug 52 may be expanded or contracted, as required, so that the size of the cells 46 of the repair plug 52 are substantially identical to the cells 46 of the core 34 being repaired, and the dimensions of the repair plug 52 are substantially same as those of the cut-out section 51. The outer peripheral cells 46b of the repair plug 52 are then trimmed as required to form flat repair plug cell wall edges 54 which extend radially outward. In preparation for installation of the repair plug 52, film or paste adhesive is applied to the bottom of the repair plug 52 and to the area of the outer facesheet 38 that is beneath the cutout section 51, so that the repair plug 52 may be bonded to the outer factsheet 38.

Figure 6:
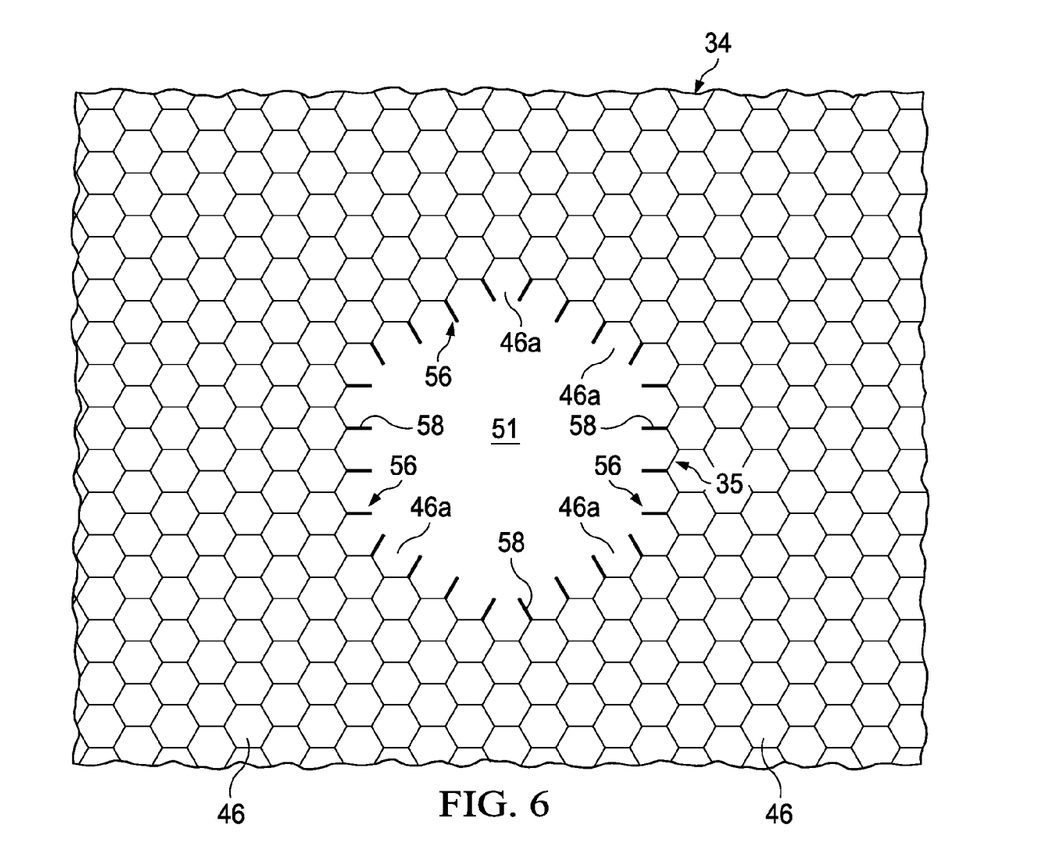
FIG. 6 is an illustration of an enlarged view of the repair area of the honeycomb core, but better showing trimmed outer cell wall edges of the core.
Figure 7:
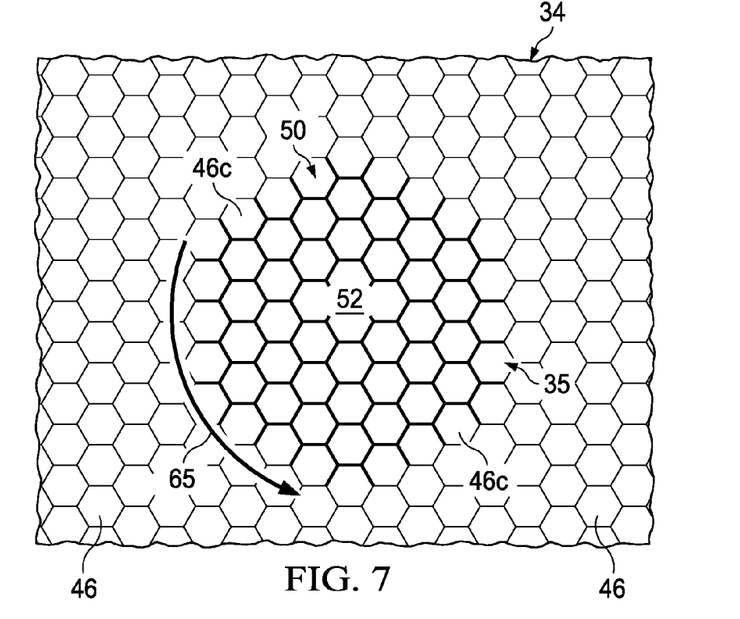
FIG. 7 similar to FIG. 4, but showing the repair plug having been inserted into the cut-out section in the core.
Figure 8:
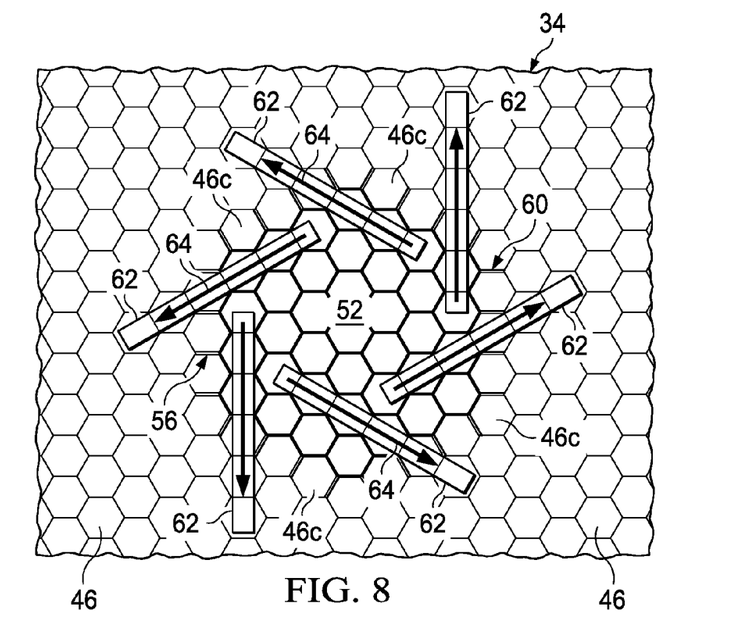
FIG. 8 is an illustration of a plan view of the honeycomb core after the repair plug has been installed, and showing strips of tape applied to hold the repair plug in place during curing.

Referring now to both FIGS. 5 and 6, the next step in the repair process consists of applying a suitable adhesive, which may be in film or paste form, to opposing faces of the flat repair plug cell wall edges 54 and the flat core cell wall edges 58 of the core 34. For example, the adhesive may be applied to the counterclockwise faces 60 of the flat repair plug cell wall edges 54, and to the clockwise faces 56 of the flat core cell wall edges 58 of the core 34. Next, as shown in FIG. 7, the repair plug 52 is inserted downwardly into the cut-out section 51 in the core 34, until the bottom of the repair plug 52 engages the outer facesheet 38. The repair plug 52 is then rotated to in a direction that brings the opposing, adhesive bearing faces into contact with each other, Thus, in the illustrated example, the repair plug 52 would be rotated in a counterclockwise direction 65 to bring the counterclockwise faces 60 of the repair plug 52 into face-to-face contact with the clockwise faces 56 of the core 34. In order to hold the faces 56, 60 against each other until the adhesive has cured, strips 62 of tape may be stretched in the direction shown at 64 in FIG. 8, and adhered to the core and the repair plug 52 in order to bias the repair plug 52 in the counterclockwise direction 65, and thereby load the faces 56, 60 against each other. The repair area 35 may be then subjected to elevated temperature in order to cure the thermally adhesive and thereby bond the repair plug 52 to the core 34. Other cure techniques may be possible.

Figures 9, 10:
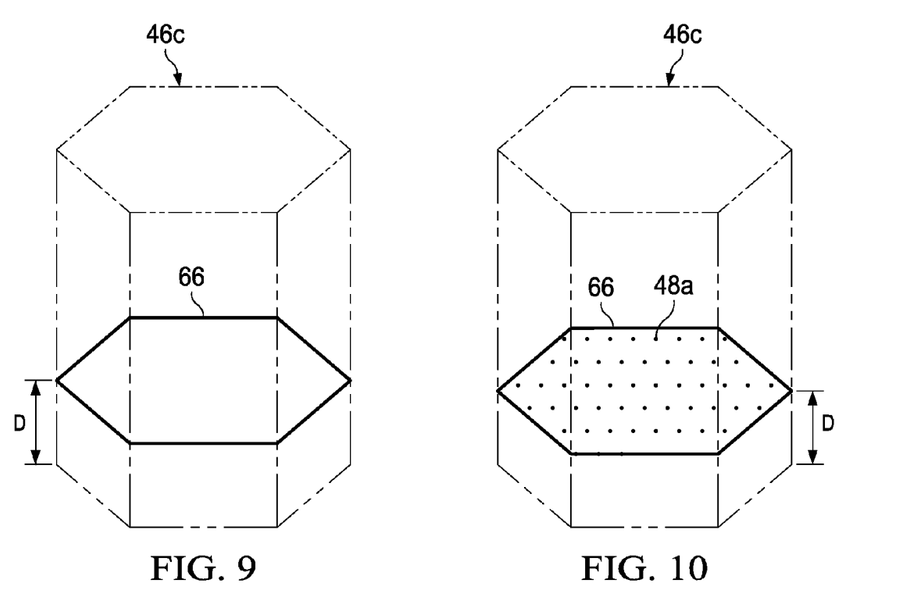
FIG. 9 is an illustration of an isometric view of one of the cells showing an adhesive having been applied to the walls of the cell at a preselected depth.
FIG. 10 is an illustration similar to FIG. 9, but showing a perforated septum having been inserted into the cell.

After the adhesive between the repair plug 52 and the core 34 has cured, the individual septums 48 in the cells 46*c* (FIG. 8) lying between the repair plug 52 and the core 34 must be replaced. Referring to FIG. 9, in order to replace the missing septa 48, an adhesive 66 is applied to the walls of the cells 46*c* at a preselected depth "D". Then, as shown in FIG. 10, an individual replacement septum 48*a* is inserted into each of the cells 46*c* and brought into contact with the adhesive 66, following which the adhesive 66 may be cured using thermal cure or other techniques.

Figure 11:
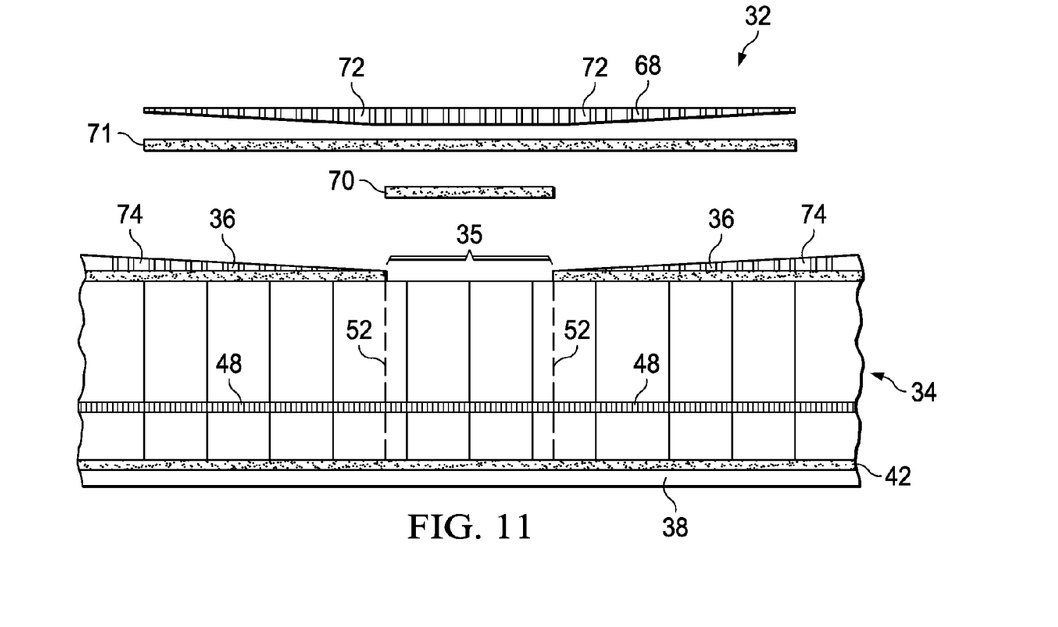
FIG. 11 is an illustration of an exploded, cross-sectional view of a honeycomb sandwich panel repair, including an inner facesheet repair patch.

Referring now to FIG. 11, with the core 34 having been repaired, conventional techniques may be used to repair the inner facesheet 36. For example, the area 74 of the inner facesheet 36 surrounding the repair area 35 may be scarfed at 74, and a repair patch 68 may be fabricated having a taper 72 that substantially matches the scarf 74. A layer of adhesive 70 may be applied to the core 34 in the repair area 35 and another layer of adhesive 71 may be used to adhesively bond the repair patch 68 to the inner facesheet 36 using conventional vacuum bagging techniques to press the repair patch 68 against the inner facesheet 36 while the layers of adhesive 70, 71 are being cured.

Figure 12:
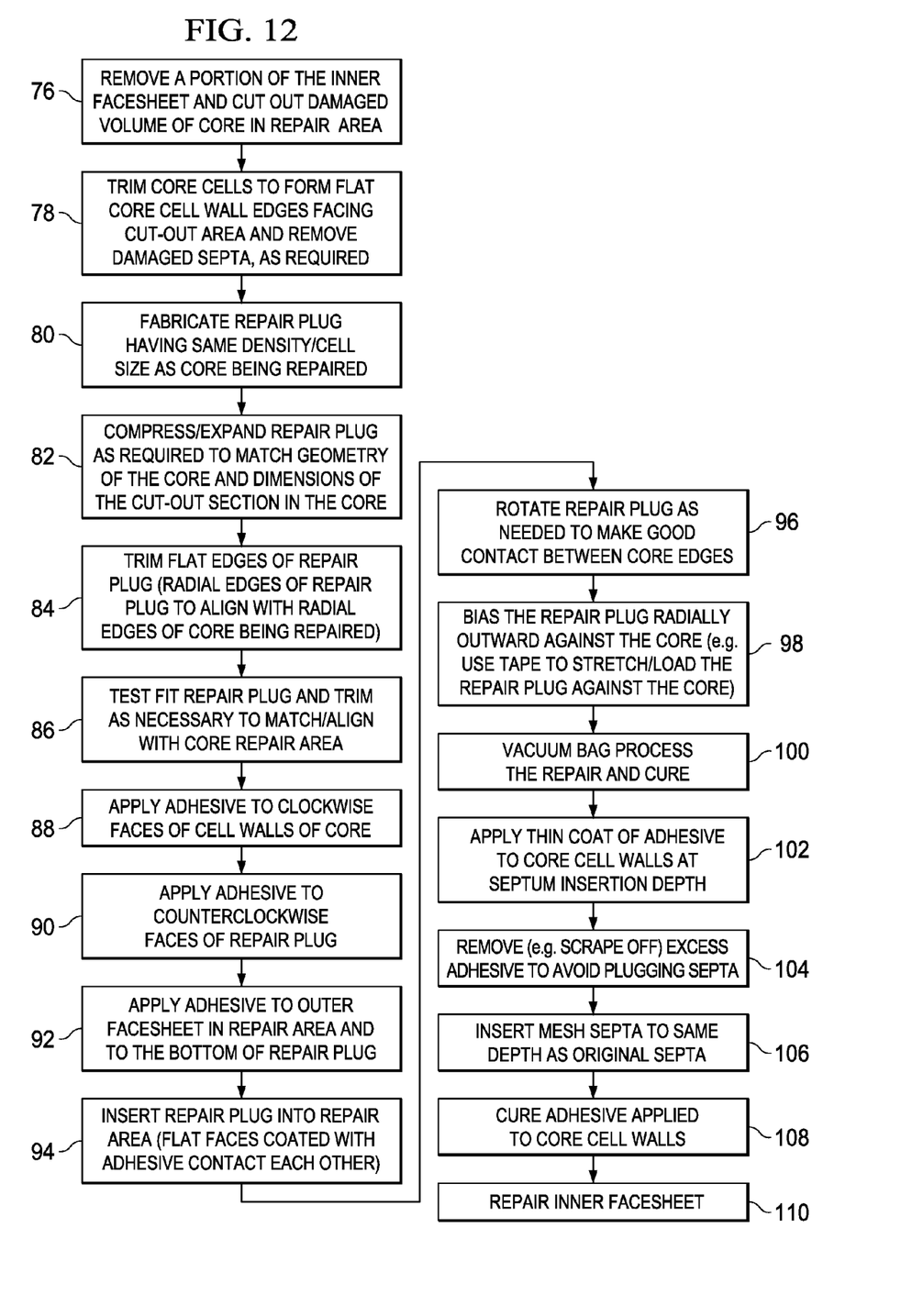
FIG. 12 is an illustration of a flow diagram of a method of repairing an acoustically treated area of a structure.

FIG. 12 is a flowchart illustrating additional details of the repair method previously described. Beginning at step 76, a portion of the inner facesheet 36 in the repair area 35 is removed, and the damaged volume of the core 34 is cut out, leaving a cut-out section 51 in the core 34. At step 78, the peripheral cells 46*a* of the core 34 surrounding the cut-out section 51 are trimmed to form flat core cell wall edges 58 which face the cut-out 51. Septa 48 damaged in the process of trimming the cells 46*a* in step 78 are removed. At step 80, a repair plug 52 is fabricated which possesses substantially the same density and cell size as the core being repaired. At step 82, the repair plug 52 is compressed or expanded, as required, to match the geometry of the core 34 being repaired, and the dimensions of the cut-out section 51.

At step 84, the repair plug 52 is trimmed to form flat repair plug cell wall edges 54 so that radial edges of the repair plug 52 are aligned with the radial edges of the core 34. At step 86, the repair plug 52 is test fit into the cut-out section 51 of the core 34, and then trimmed as necessary to match and align with the flat core cell wall edges 58 of the core 34. At step 88, adhesive is applied to the clockwise faces 56 of the flat core cell wall edges 58 of the core 34. Similarly at step 90, adhesive is applied to the counterclockwise faces 60 of the repair plug 52. At step 92, an adhesive is applied to the inside face of the outer facesheet 38 and to the bottom edges of the repair plug 52. At 94, the repair plug 52 is then inserted into the cut-out section 51 of the core 34, and at step 96, the repair plug 52 is rotated as required so as to make good contact with the edges of the core 34.

At step 98, the repair plug 52 is biased both radially outwardly and counterclockwise against the core 34 so that the opposing faces 56, 60 of the repair plug and the core 34 respectively, overlap and make good contact with each other. Biasing of the repair plug 52 in this manner may be accomplished by stretching strips 62 of adhesive tape between the core 34 and the repair plug 52, as previously described. Next, at step 100, the core repair is vacuum bag processed and cured following which, the strips 62 of tape may be removed. At step 102, a relatively thin coat 66 of adhesive is applied to the walls of those cells 46*c* requiring replacement septa 48*a*. The adhesive is applied to the cell walls at a preselected septum insertion depth "D". At 104, any excess adhesive is removed from the cell walls to avoid plugging the septa 48*a*. At 106, mesh-type septa 48*a* may be inserted into the cells 46*c* at the depth "D" of the adhesive. At 108, the adhesive may be cured in order to bond the septa 48*a* to the cell walls. At step 110, the inner facesheet 36 may be repaired, as previously described, using a suitable repair patch 68 and bonding techniques which are well known in the art.

Figure 13:
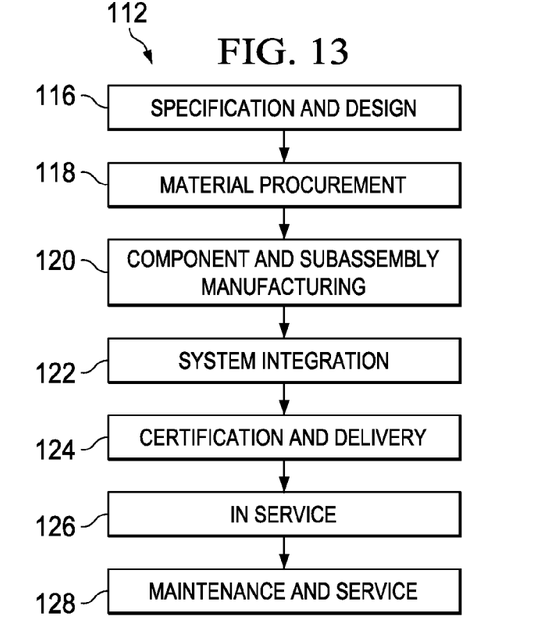
FIG. 13 is an illustration of a flow diagram of aircraft production and service methodology.
Figure 14:
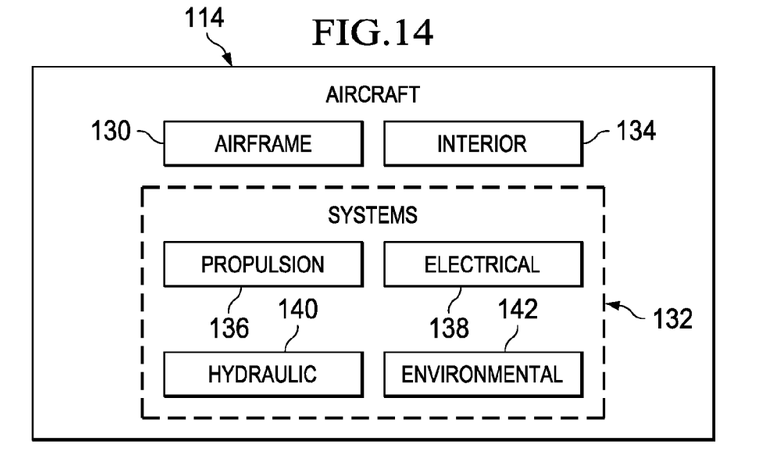
FIG. 14 is illustration of a block diagram of an aircraft.

Embodiments of the disclosure may find use in a variety of potential applications, particularly in the transportation industry, including for example, aerospace, marine, automotive applications and other application where acoustic treatments may be employed. Thus, referring now to FIGS. 13 and 14, embodiments of the disclosure may be used in the context of an aircraft manufacturing and service method 112 as shown in FIG. 13 and an aircraft 114 as shown in FIG. 14. Aircraft applications of the disclosed embodiments may include, for example, without limitation, repair of acoustically treated areas around engines, such as engine nacelles. During pre-production, exemplary method 112 may include specification and design 116 of the aircraft 114 and material procurement 118. During production, component and subassembly manufacturing 120 and system integration 122 of the aircraft 114 takes place. Thereafter, the aircraft 114 may go through certification and delivery 124 in order to be placed in service 126. While in service by a customer, the aircraft 114 is scheduled for routine maintenance and service 128, which may also include modification, reconfiguration, refurbishment, and so on.

Each of the processes of method 112 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 114 produced by exemplary method 112 may include an airframe 130 with a plurality of systems 132 and an interior 134. Examples of high-level systems 132 include one or more of a propulsion system 136, an electrical system 138, a hydraulic system 140, and an environmental system 142. Any number of other systems may be included. Although an aerospace example is shown, the principles of the disclosure may be applied to other industries, such as the marine and automotive industries.

Systems and methods embodied herein may be employed during any one or more of the stages of the production and service method 112. For example, components or subassemblies corresponding to production process 120 may be fabricated or manufactured in a manner similar to components or subassemblies produced while the aircraft 114 is in service. Also, one or more apparatus embodiments, method embodiments, or a combination thereof may be utilized during the production stages 120 and 122, for example, by substantially expediting assembly of or reducing the cost of an aircraft 114.

Similarly, one or more apparatus embodiments, method embodiments, or a combination thereof may be utilized while the aircraft 114 is in service, for example and without limitation, to maintenance and service 128.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of repairing an area of an acoustically treated structure having a cellular honeycomb core, comprising:
    forming a cut-out section in the core by removing a volume of the core;
    inserting a cellular honeycomb repair plug into the cut-out section;
    bringing cell wall edges of the repair plug into contact with cell wall edges of the core; and
    bonding together the cell wall edges of the repair plug and the cell wall edges of the core, wherein bonding together the cell wall edges of the repair plug and the cell wall edges of the core includes applying an adhesive to opposing faces of the cell wall edges of the repair plug and the cell wall edges of the core before the cell wall edges of the repair plug are brought into contact with cell wall edges of the core.

2. The method of claim 1, further comprising:
    applying an adhesive to bottom edges of the repair plug; and
    applying adhesive to an outer facesheet beneath the cut-out section,
        and wherein inserting the repair plug into the cut-out section includes bringing the bottom edges of the repair plug into contact with the outer facesheet.

3. The method of claim 1, further comprising:
    fabricating the repair plug by cutting a plug blank from a cellular honeycomb core panel; and
    expanding or contracting the plug blank such that the size and density of the cells of the plug blank substantially match the size and density of the cells of the core.

4. The method of claim 1, further comprising:
    trimming cell wall edges of the core; and
    trimming cell wall edges of the repair plug to substantially match the trimmed cell wall edges of the core.

5. The method of claim 1, further comprising biasing the cell wall edges of the repair plug against the cell wall edges of the core until the adhesive is cured.

6. The method of claim 5, wherein the biasing is performed by stretching and applying tape between the core and the repair plug, and using the tape to apply a rotary force against the repair plug that forces the cell wall edges of the repair plug against the cell wall edges of the core.

7. The method of claim 1, wherein bringing cell wall edges of the repair plug into contact with cell wall edges of the core is performed by rotating the repair plug relative to the core.

8. The method of claim 1, further comprising:
    removing acoustic septa from peripheral cells of the core surrounding the cut-out section; and
    installing replacement septa in the peripheral cells after the bonding has been performed.

9. The method of claim 8, wherein installing the replacement septa includes:
    applying adhesive to the walls of the peripheral cells at a preselected depth,
    inserting the replacement septa into the peripheral cells and bringing the replacement septa into contact with the adhesive on the walls of the peripheral cells at the preselected depth, and
    curing the adhesive to bond the replacement septa respectively to the walls of the peripheral cells.

10. The method of claim 1, further comprising:
    removing a portion of a facesheet overlying the area of the structure requiring repair; and
    installing a facesheet repair patch over the repair plug.

11. A method of restoring the acoustic performance of an acoustically treated structure, comprising:
    removing a volume of a cellular acoustic core in an acoustically impaired area of the structure;
    replacing the volume of the core that has been removed with a cellular repair plug; and
    bonding cell wall edges of the core to cell wall edges of the repair plug, wherein bonding the cell wall edges of the core to the cell wall edges of the repair plug includes applying an adhesive to at least one of the cell wall edges of the core and the cell wall edges of the repair plug, and bringing the cell wall edges of the repair plug into face-to-face contact with the cell wall edges of the repair plug.

12. The method of claim 11, wherein bringing the cell wall edges of the repair plug into face-to-face contact with the cell wall edges of the repair plug is performed by rotating the repair plug relative to the core.

13. The method of claim 11, further comprising:
    trimming peripheral edges the core; and
    trimming peripheral edges of the repair plug such that the peripheral edges of the core overlap the peripheral edges of the repair plug.

14. The method of claim 11, wherein bonding cell wall edges of the core to cell wall edges of the repair plug includes:
    curing the adhesive.

15. The method of claim 14, wherein bonding the cell wall edges of the core to the cell wall edges of the repair plug includes biasing opposing faces of the cell wall edges of the repair plug against the cell wall edges of the core while the adhesive is being cured.

16. The method of claim 14, further comprising:
    removing damaged septa within cells of the core;
    applying an adhesive to the cell walls of the core and to cell walls of the repair plug at a preselected depth;
    inserting replacement septa into those cells from which the septa were removed;
    bonding the replacement septa to the core by bringing the replacement septa into contact with the adhesive at the preselected depth and curing the adhesive.

17. The method of claim 16, wherein insertion of the replacement septa into the cells and bonding the replacement septa to the core is performed after the cell wall edges of the core have been bonded to cell wall edges of the repair plug.

18. A method of repairing an acoustically treated structure having a honeycomb core, comprising:
    removing an impaired volume of the honeycomb core to form a cut-out section in the core;
    trimming peripheral edges of the core surrounding the cut-out section to form cell wall edges projecting inwardly into the cut-out section;

making a cellular repair plug, including sizing the repair plug to substantially fit the cut-out section and trimming outer peripheral cells of the repair plug to form cell wall edges that project outwardly toward the core;

applying adhesive to the cell wall edges of the core and the cell wall edges of the repair plug;

inserting the repair plug into the cut-out section in the core; and rotating the repair plug until the cell wall edges of the repair plug come into face-to-face contact with the cell wall edges of the core.

19. The method of claim 18, further comprising:

curing the adhesive; and biasing the cell wall edges of the repair plug against the cell wall edges of the core while the adhesive is curing.

20. The method of claim 19, wherein biasing the cell wall edges of the repair plug against the cell wall edges of the core while the adhesive is curing is performed by stretching and adhering strips of tape between the core and the repair plug.

\* \* \* \* \*